US006185360B1

(12) United States Patent
Inoue et al.

(10) Patent No.: US 6,185,360 B1
(45) Date of Patent: *Feb. 6, 2001

(54) INFORMATION RECEIVING SYSTEM AND METHOD

(75) Inventors: Hideki Inoue, Takatsuki; Etsuyoshi Sakaguchi, Ibaraki; Hidemi Henmi, Otsu, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/947,298

(22) Filed: Oct. 8, 1997

(30) Foreign Application Priority Data

Oct. 8, 1996 (JP) .................................................. 8-267103

(51) Int. Cl.$^7$ ........................................................ H04N 5/76
(52) U.S. Cl. .............................. 386/46; 386/83; 386/95
(58) Field of Search .................................. 386/46, 83, 95, 386/92; 360/27; 348/13, 906, 731; H04N 5/76

(56) References Cited

U.S. PATENT DOCUMENTS

| 5,187,589 | * | 2/1993 | Kono et al. ........................... 386/92 |
| 5,307,173 | * | 4/1994 | Yuen et al. ............................ 386/83 |
| 5,379,153 | * | 1/1995 | Ishii et al. ............................ 360/27 |
| 5,585,865 | * | 12/1996 | Amano et al. ...................... 348/906 |
| 5,686,954 | * | 11/1997 | Yoshinobu et al. ................... 348/13 |

FOREIGN PATENT DOCUMENTS

| 3-40977 | 6/1991 | (JP) . |
| 6-253221 | 9/1994 | (JP) . |
| 7-65436 | 3/1995 | (JP) . |

* cited by examiner

Primary Examiner—Huy Nguyen
(74) Attorney, Agent, or Firm—Ratner & Prestia

(57) ABSTRACT

Comprising memory means for recording contents of a program and service additional information containing information relating to a program received in an information receiving apparatus, means for reserving to record a program on the basis of service additional information, means for detecting overlapping of recording time of programs, selecting means for comparing service additional information of programs overlapped in recording time, and selecting a program preferable for the user, means for changing record reservation of program on the basis of the result of selection, viewing trend survey means for investigating the viewing trend of the user, and reproducing means, a program preferable for the user is automatically reserved for recording according to service additional information, or a preferred program out of overlapped programs is automatically selected and recorded in the case of change in broadcasting time.

10 Claims, 14 Drawing Sheets

| | 20:00 | 21:00 | 22:00 | 23:00 |
|---|---|---|---|---|
| 1ch | Baseball: ABC vs. XYZ | | Drama: Detective O | News |
| 3ch | Quiz | | Movie: Jurassic Land | |
| 5ch | Olympic Best selection | | Today's Cooking | English conversation |

| | 20:00 | 21:00 | 20 | 22:00 | 20 | 23:00 |
|---|---|---|---|---|---|---|
| 1ch | Baseball: ABC vs. XYZ | | | Drama: Detective O | | News |
| 3ch | Quiz | | Movie: Jurassic Land | | | |
| 5ch | Olympic Best selection | | Today's Cooking | | English conversation | |

FIG. 7A

| | 20:00 | 21:00 | 22:00 | 23:00 |
|---|---|---|---|---|
| 1ch | Baseball: ABC vs. XYZ | | Drama: Detective 0 | News |
| 3ch | Quiz | | Movie: Jurassic Land | |
| 5ch | Olympic Best selection | | Today's Cooking | English conversation |

FIG. 7B

| | 20:00 | 21:00 | 22:00 | 23:00 |
|---|---|---|---|---|
| 51ch | Movie: Here Lie the Trees Now | | Movie: XXX | |
| 53ch | Variety Show | | Sports Special | News |
| 55ch | Drama series | | News | Sports |

FIG. 7C

| | 20:00 | 21:00 | 22:00 | 23:00 |
|---|---|---|---|---|
| 1ch | Baseball: ABC vs. XYZ | | Drama: Detective 0 | News |
| 3ch | Quiz | | Movie: Jurassic Land | |
| 51ch | Movies: Here Lie The Trees Now | * * | Movie: XXX | |

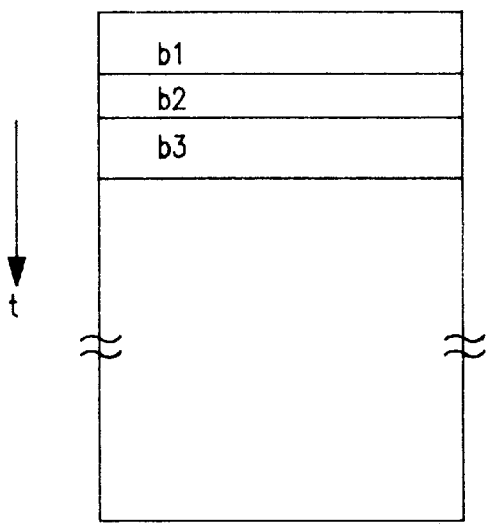
FIG. IOA
Reproduction of program B
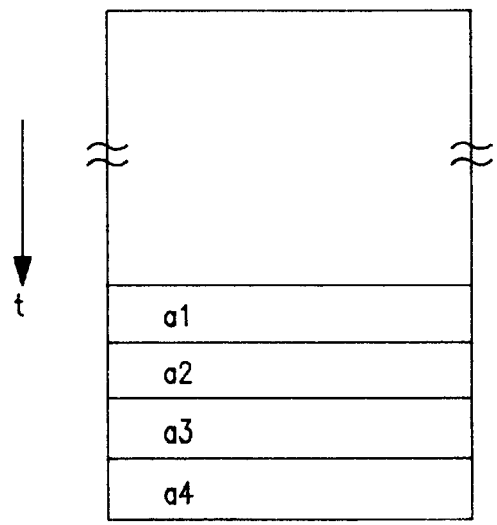
FIG. IOB
Reproduction of program A

INFORMATION RECEIVING SYSTEM AND METHOD

BACKGROUND OF THE INVENTION

The present invention relates to an information receiving method capable of recording by reservation, and an information receiving apparatus using the same method.

When the broadcast starting time for a program reserved for the purpose of recording (hereinafter called a reserved program) is delayed, or when the broadcasting time of the reserved program is changed, and even if overlapped with the broadcasting time of other reserved program, the invention is intended to provide an information receiving method and an information receiving apparatus capable of selecting and recording a preferred program for the user. Moreover, when receiving service addition information introducing the content of the program beforehand, by automatically judging whether or not to reserve recording of the program indicated by this service additional information, the information receiving apparatus reserves recording automatically on the basis of this judgment.

Herein, the service additional information is the information necessary for reservation of a program recording, including, for example, the program name, summary of the program, broadcasting time, tariff information, distribution form, program genre, and others. The service additional information may be either distributed alone for introduction of the program, or distributed together with the contents of the program during distribution of the program as reference information.

If a broadcast program cannot be viewed in real time, it is a general practice to reserve recording of the program in the recording apparatus, and play it back later. If the broadcasting time of the program before this program reserved for recording, that is, the reserved program, is delayed, the method for recording the reserved program securely is disclosed, for example, in Japanese Laid-open Patent No. 7-65436 or No. 6-253221. If the recording start time is changed, the method of changing the reserved time is disclosed in Japanese Patent Publication No. 3-40977.

In the background of promotion of multiple-channel service by digital broadcasting, it is now possible to reserve recording of a program by utilizing a so-called electronic program guide (hereafter abbreviate EPG). However, if the EPG of all channels cannot be displayed on the display screen at the same time, it is not possible to confirm on the screen if plural programs are reserved in the same time zone, and duplicate reservation of recording may occur. Moreover, if plural people share one recording apparatus, if the EPG of all channels cannot be displayed on the display screen at the same time, it is very difficult to check all channels on the screen for reservation of programs by other people. To cope with this problem, there is a prior art for rejecting the instruction for reservation of recording of a program in a same time zone already reserved by others, and warning duplicate reservation to the user on the screen.

If the record starting time of such reserved program is changed due to change of broadcasting time of the preceding program or other reason, generally, the recording end time is changed at the same time. Accordingly, successively to a first reserved program, if a second program is reserved in other channel, in case the record end time is altered due to change of broadcasting time of the first reserved program, the recording time of the first reserved program and the recording time of the second reserved program overlap, and the overlapped portion of the second reserved program is not recorded.

For a third reserved program, if recording reservation for a fourth program is instructed in the same time zone as the broadcasting time of the third program, this instruction of fourth reserved program is not accepted, and overlapping of the time of the program is warned on the screen to the user, as mentioned in the prior art above. Once knowing the duplicate recording reservation on the screen, the user considers the priority of the programs, and manipulates again for reservation, which was very inconvenient.

In the prior art, the program to be newly reserved for recording cannot be selected automatically, and the user must select the program. Accordingly, the user must always check the information of many programs from the service additional information beforehand, and find the broadcast schedule of preferred programs.

It is hence an object of the invention to present an information receiving method and an apparatus using the same, capable of making necessary recording automatically, when the recording time of plural reserved programs is overlapped, by judging from the program information of the service additional information, and selecting and reserving the more preferred program for the user. It is also an object to present an information receiving method and an apparatus using the same, capable of reserving recording of a preferred program for the user automatically by using the service additional information.

SUMMARY OF THE INVENTION

The invention presents an information receiving method for receiving a program containing picture, sound, and/or data, and service additional information relating to this program, comprising:

a step of receiving the program and service additional information, a step of recording the received program and service addition information, a step of reserving to record a received program, a step of detecting duplication of recording time of a reserved program to be recorded, from the recorded service additional information, and a step of displaying duplication of reserved recording time.

The invention further presents an information receiving method comprising:

a step of selecting one program from the reserved programs of which duplication of reserved time is detected, by using service information, relating to reservation for recording of duplicated portion, and a step of changing the reservation for recording on the basis of the result of selection.

The invention also presents an information receiving apparatus for receiving a program containing picture, sound, and/or data, and service additional information relating to a program, comprising:

information receiving means for receiving the program and service additional information, memory means for recording the program and service additional information received by this information receiving means, reservation input means for reserving to record the program indicated by the service additional information received by the information receiving means, memory control means for detecting duplication of recording time of the reserved programs, that is, the programs reserved for recording by the reserve input means, referring the service additional information, and display means for displaying detection of duplication of recording time of plural reserved programs by the memory control means.

The apparatus further comprises:

program list compiling means for compiling EPG from the recorded service additional information, program input means for setting a program reservation for recording, that is, a reserved program on the basis of the received service additional information, selecting means for selecting a certain program when duplication of recording time occurs, viewing trend investigating means for investigating the viewer's viewing trend from the past record reservations, memory change means for changing the content of record reservation on the basis of the selected result, display means for displaying the event of duplication of recording time or selection of program for recording the overlapped portions, communication means for noticing the duplication or selection to a person at a remote place, and external signal input means for entering an instruction signal from outside.

By this method and structure, using the entered service additional information, or the EPG compiled on the basis thereof, the user can reserve to record a desired program directly, or automatically by the information recording method and its apparatus, if the broadcasting time of the reserved program to be recorded is changed, or when newly reserving a program to be recorded, it is automatically investigated to check for duplication of the recording time with the already reserved program to be recorded, and the duplication, if detected, is noticed by display or communication means.

Moreover, comparing the service additional information of the duplicated programs, the program more preferable for the user is selected to be recorded, and on the basis of the result of selection, the reservation for recording is changed, and a more preferable program for the user is recorded.

BRIEF DESCRIPTION OF THE DRAWINGS

FIG. 6-a is a diagram showing an example of EPG displayed on a monitor screen in the information receiving apparatus of embodiment 1 of the invention.

FIG. 6-b is a diagram showing an example of EPG after change of record reservation displayed on the monitor screen in the information receiving apparatus of embodiment 1 of the invention.

FIG. 7-a is a diagram of a first example of EPG for explain-ing the operation of an information receiving apparatus according to embodiment 2 of the invention, and its modified example.

FIG. 7-b is a diagram of a second example of EPG for explaining the operation of the information receiving apparatus according to embodiment 2 of the invention, and its modified example.

FIG. 7-c is a diagram of a third example of EPG for explaining the operation of the information receiving apparatus according to embodiment 2 of the invention, and its modified example.

FIG. 10-a is a diagram for explaining the reproducing operation of program B by the information receiving apparatus of embodiment 3 of the invention.

FIG. 10-b is a diagram for explaining the reproducing operation of program A by the information receiving apparatus of embodiment 3 of the invention.

FIG. 11-b is a diagram showing the flow of operation for reserving to record a program in the information receiving apparatus of embodiment 1 of the invention.

FIG. 11-c is a diagram showing the flow of operation for changing the reservation of recording a program in the information receiving apparatus of embodiment 1 of the invention.

DETAILED DESCRIPTION OF THE INVENTION

Exemplary Embodiment 1

Figure 1:
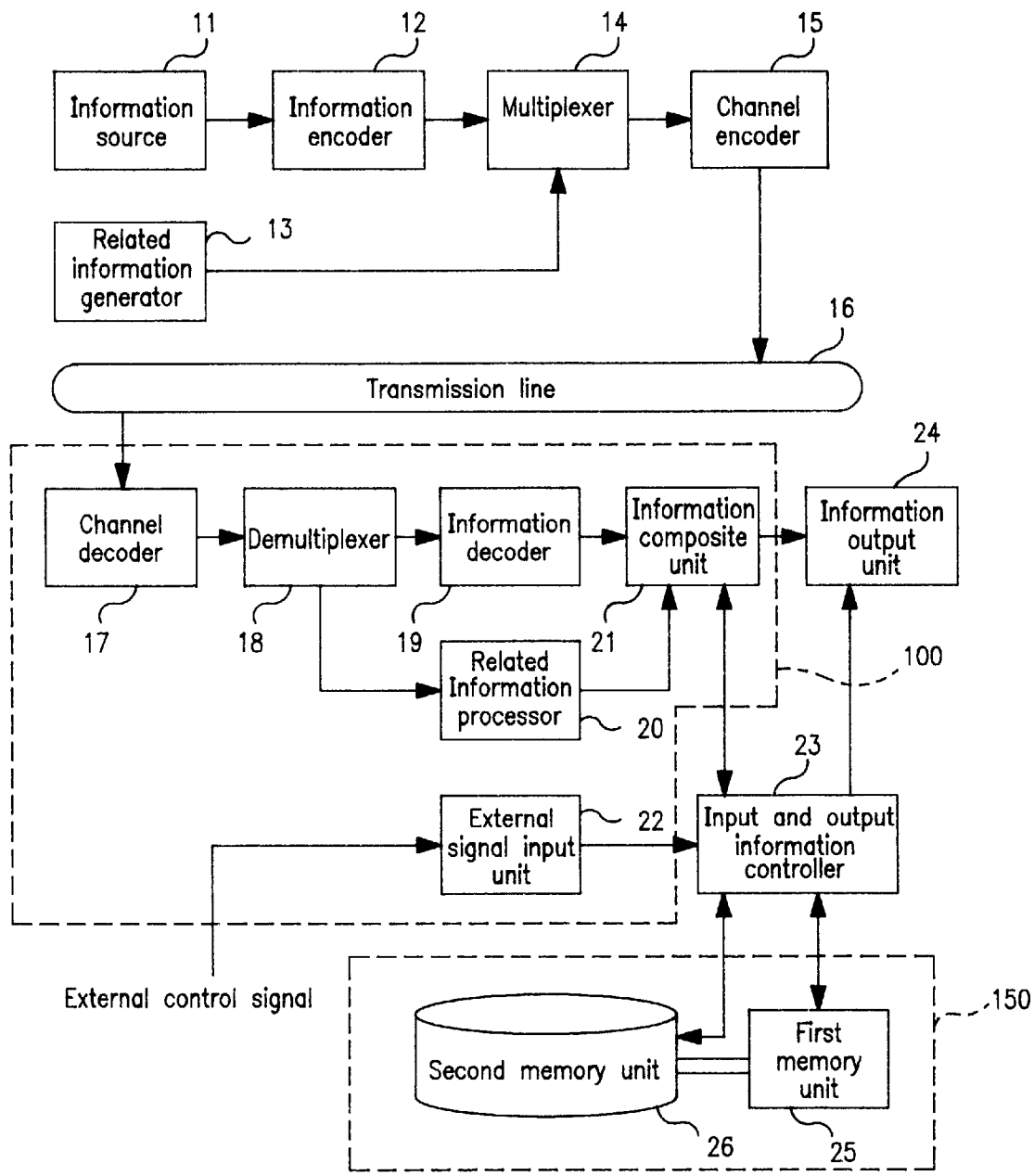
FIG. 1 is a diagram showing a structure of an information receiving apparatus according to embodiment 1 of the invention, and a related transmitting apparatus.

FIG. 1 is a diagram for explaining a structure of an information receiving apparatus according to embodiment 1 of the invention. Referring now to FIG. 1, the structure of the information receiving apparatus is described below.

Reference numeral 11 is an information source including a picture signal composed of still image or moving image, a sound signal, and/or data, 12 is an information encoder for coding the picture signal and/or sound signal according to a specific coding method, for example, the standard of MPEG (Moving Picture Image Coding Experts Group), and 13 is a related information generator for generating related information not required to be coded particularly among the service additional information necessary for selecting a transmitted program as a program reserved to be recorded, and information not required to be coded particularly among contents in the program information. Such related information includes, for example, the type of picture, sound and data for composing a program, program number, and broadcast starting time, and is the information not required to be coded. Usually, these pieces of information are generated on the basis of the MPEG system standard (Generic Coding of Moving Pictures and Associated Audio: System Recommendation H. 222.0, ISO/IEC 13818-1), or the system standard of DVB for digital broadcasting in Europe (Digital Video Broadcasting (DVB) Systems, ETS 300468, January 1996).

Reference numeral 14 is a multiplexer for multiplexing the coded signal and related information, 15 is a channel encoder including error correction coding means for processing the data for protection from transmission error and digital modulating means for sending out a digital signal, and 16 is a transmission line composed of a transmitter, actual transmission line, and a tuner of information receiving apparatus side.

Reference numeral 100 is information receiving means of embodiment 1, that is, an information receiving apparatus, 17 is a channel decoder composed of digital demodulating means for demodulating the digital modulated signal, and error correction means for data error occurring in the transmission line 16, 18 is a demultiplexer for de-multiplexing the multiplexed digital signal delivered from the channel decoder 17 into a coded picture signal, sound signal, and/or data signal, and related information, 19 is an information decoder for decoding the coded signal into a picture signal and/or sound signal, 20 is a related information processor for processing the related information not required to be decoded as being entered from the demultiplexer 18, 21 is an information composite unit for combining the picture, sound and/or data delivered from the information decode 19 and related information processor 20, 24 is an information output unit for delivering the picture, sound and/or data combined in the information composite unit 21, and 23 is an input and output information controller for receiving the output of the information composite unit 21 and the external control signal entered through an external signal input unit 22, and creating and issuing a program list or EPG, and also controlling the recording of signal such as program and service additional information.

Reference numeral 150 is memory means composed of a first memory unit 25 for storing service additional information for creating the EPG issued by the input and output information controller 23,and the information about reserved recording of program, that is, the program record reservation information, and a second memory unit 26 for recording the contents of the program to be recorded, and the service additional information to be recorded together with the contents.

Figure 2:
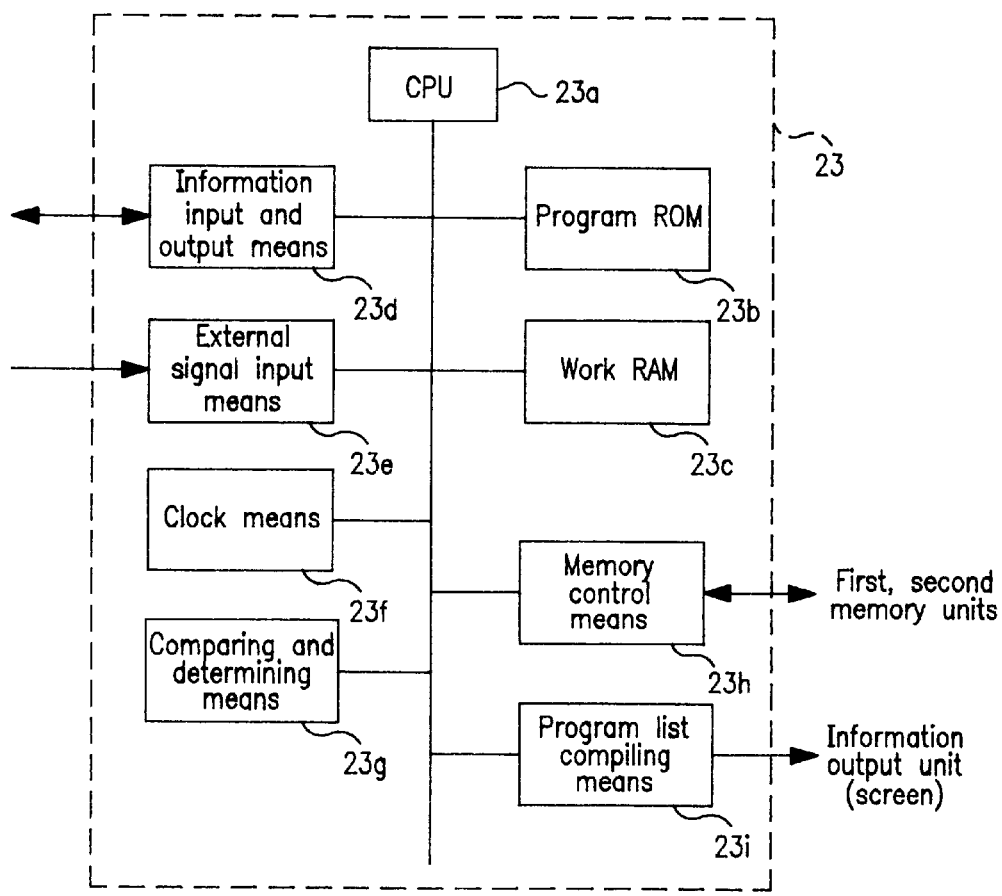
FIG. 2 is a diagram showing a detailed structure of an input and output information controller 23 of the information receiving apparatus in embodiment 1 of the invention.

FIG. 2 is a diagram showing a detailed structure of the input and output information controller 23 of the information receiving apparatus of embodiment 1.

In FIG. 2, reference numeral 23*a* is a central processing unit (hereafter abbreviated CPU) for controlling the information through the input and output information controller 23; 23*b* is a program ROM to storing a program for controlling each means connected to the CPU 23*a*, which is used by the CPU 23*a* for controlling data writing, reading, and searching; 23*c* is a work RAM for temporarily storing the information when the CPU 23*a* calculates or controls the information; 23*d* is information input and output means for exchanging information composed of picture, sound and/out data with the information composite unit 21; 23*e* is external signal input means for receiving an external control signal such as program reservation input by the user through the external signal input unit 22; 23*f* is clock means for counting the present time; and 23*g* is comparing and determining means combining selecting means for comparing the service additional information of programs overlapped in recording time and determining which program to record, when record control means 23*h* described below compares the time information of service additional information of plural programs reserved for recording and detects overlapping of recording time, and means for determining various conditions about recording as mentioned below.

The record control means 23*h* is means for controlling reading and recording of the information received from the information composite unit 21 into memory means 150, and further this record control means 23*h* records the service additional information received from the information composite unit 21 and/or the program record reservation information showing the detail of record reservation in the first memory unit 25 is of the memory means 150, records the contents of the program to be recorded or the contents accompanying the service additional information about the program, on the basis of the program record reservation information, in the second memory unit 26 of the memory means 150, and further presents the service additional information necessary for compiling the EPG to program list compiling means 23*i* described below by reading out from the first memory unit 25, and moreover compares the time information of the service additional information of the plural programs reserved for recording, thereby detecting whether the recording time is overlapped or not. The program list compiling means 23*i* is means for compiling the EPG on the basis of the service additional information recorded in the first memory unit 25, and issuing to the information output unit 24.

The operation of the information receiving apparatus of embodiment 1 is described below.

First, at the information sender side, the information encoder 12 encodes the picture signal composed of still image or moving image, sound signal and/or data from the information source 11 according to a coding method, for example, the coding method specified in MPEG, the related information generator 13 generates information not required to be coded, out of service additional information necessary for selecting a program, for example, the program genre, data size, broadcast starting time of program, broadcast ending time of program, other time information, and other information, and the multiplexer 14 multiplexes the signals issued from the information encoder 12 and related information generator 13. This multiplexing is performed in accordance with, for example, the MPEG system standard or DVB system standard of digital broadcasting standard in Europe. The channel encoder 15 is error correction coding means for processing the data for protecting the multiplexed digital signal from transmission error and digital modulating means for sending out digital signal. The transmission line 16 is an actual transmission line for transmitting the output signal of the channel encoder 15.

Figure 11A:
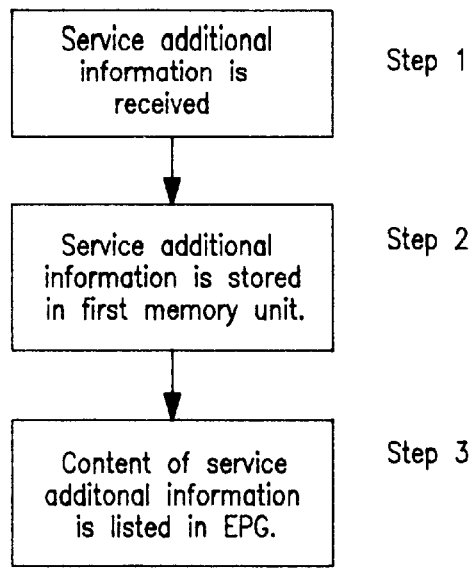
FIG. 11-a is a diagram showing the flow of operation for recording service additional information in the information receiving apparatus of embodiment 1 of the invention.
Figure 11B:
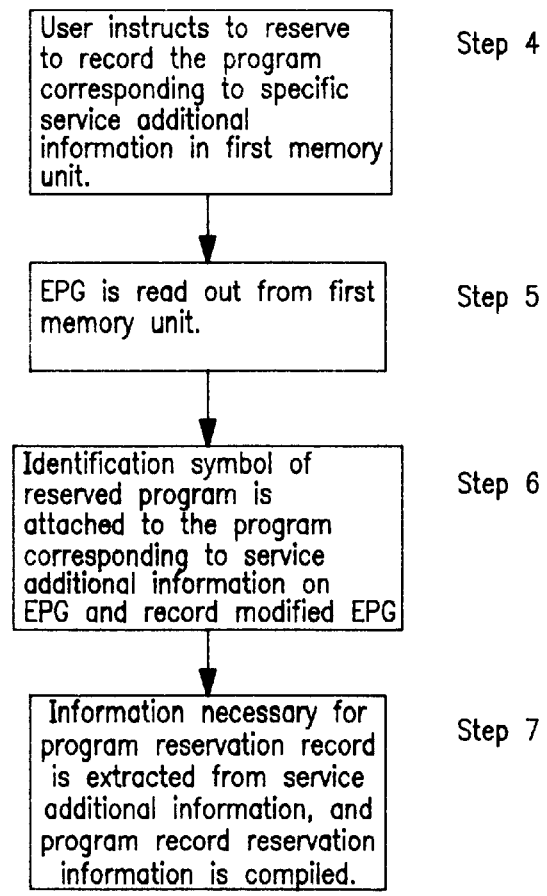
Figure 11C:
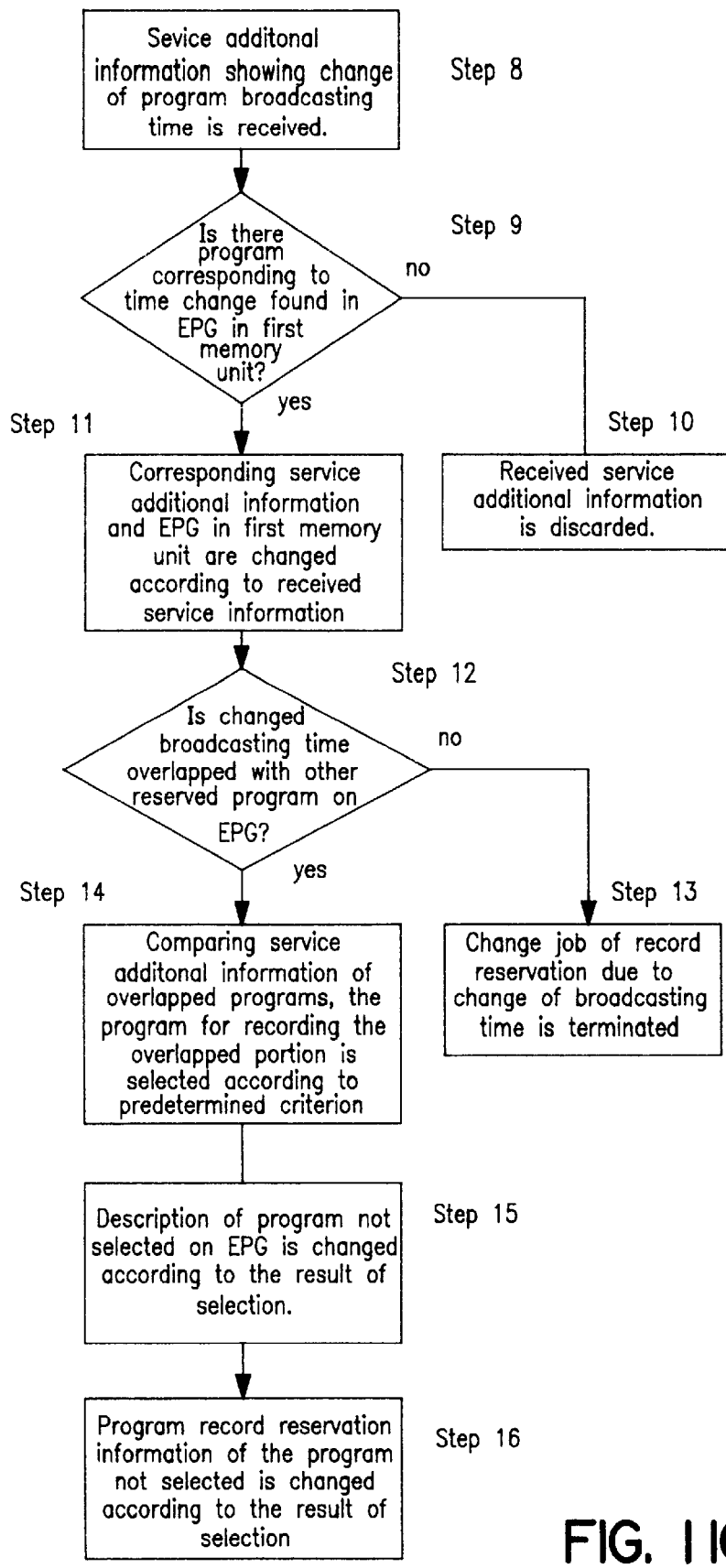

On the other hand, at the information receiving apparatus 100, the channel decoder 17 processes the signal transmitted in the transmission line 16 by digital demodulation and error correction. This channel decoder 17 processes oppositely to the channel encoder 15, and delivers the same signal as issued by the multiplexer 14 to the demultiplexer 18. The demultiplexer 18 demultiplexes the output signal of the channel encoder 17, and the demultiplexed signal is issued into the information decoder 19 and related information processor 20.The information decoder 19 decodes the entered coded signal into picture or sound signal according to, for example, the MPEG standard. The information composite unit 21 combines the signals issued from the information decode 19 and related information processor 20, and sends out into the information output unit 24 and input and output information controller 23. The signal issued to the information output unit 24 is sent out, for example, the picture signal is sent out to the monitor display unit, the sound signal to the speaker, or the data signal to the computer. The input and output information controller 23 records the service additional information issued from the information composite unit 21 into the first memory unit 25 of the memory means 150 through the memory control means 23h, and adds the content of the service additional information to the EPG. (The operation of the information receiving apparatus side is shown in steps 1 and 2 in FIG. 11-a.)

Next is explained the operation of the reservation input means for reserving to record a program by using the EPG.

The user enters an external control signal for requesting display of EPG to the input and output information controller 23 through the external signal input unit 22.

The program list compiling means 23i reads out the service additional information stored in the first memory unit 25 of the memory means 150, depending on the display request of the EGP by the user, through the memory control means 23h, and compiles the EPG on the basis of the service addition information (step 3), and issues to the information output unit 24.

The information output unit 24 displays the EPG on the monitor screen (step 5). The user scrolls the EGP on the screen or changes over the screen, and searches programs of various channels, selects a cell of a desired program, and enters an instruction adding a code showing that the program put in the selected cell is the object program reserved for recording, into the memory control means 23h of the input and output information controller 23 through the external signal input unit 22 (step 6). This input is entered by using, for example, the remote control device or keyboard.

Figure 3:
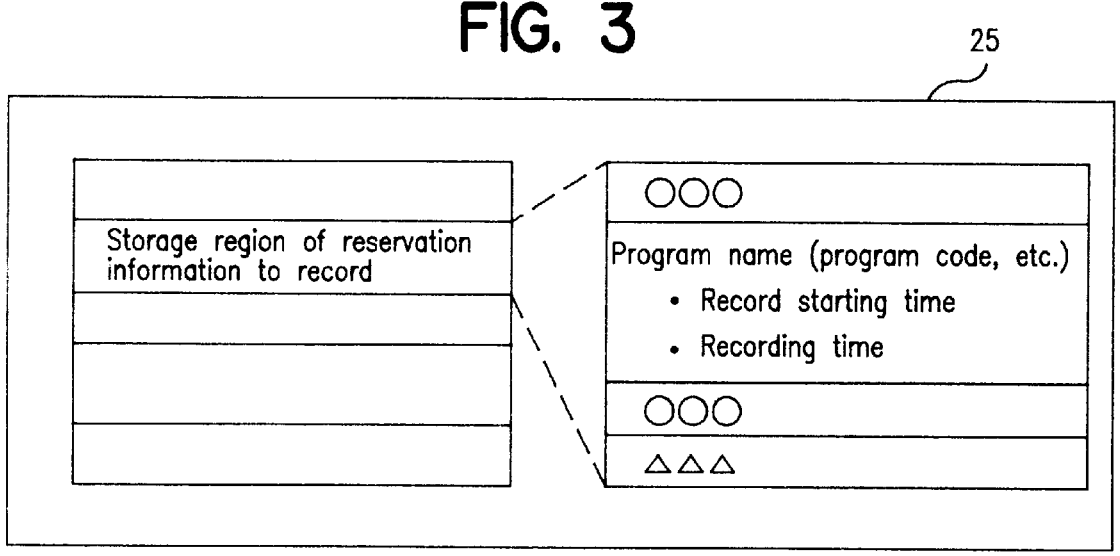
FIG. 3 is a diagram showing an example of program record reservation information recorded in a first memory unit.

The memory control means 23h records the program record reservation information showing the content of reservation for recording of the reserved program selected on the EPG, in the first memory unit 25, in a format as shown in, for example, FIG. 3 (step 7), and later checks periodically "if there is a program reserved for recording in the first memory unit 25,"and, if there is a program reserved for recording, compares the record starting time written in the program record reservation information and the present time issued by the clock means 23f, and records the corresponding program in the second memory 26 when reaching the broadcasting time of the program.

The program list compiling means 23i presents the identification signal showing that the pertinent program is the reserved program in the EPG by, for example, shading the cell of the reserved program or showing in the display color different from other cells.

Thus, the information receiving apparatus of embodiment 1 comprises the memory control means 23h which controls to record the received service additional information and information about reservation of program recording in the first memory unit 25, controls to record the reserved program in the second memory unit 26 on the basis of the information relating to the reservation of recording of the program recorded in the first memory unit 25, and investigates if there is any overlapping of recording time of the reserved programs being already reserved for recording due to change, when receiving the service additional information including change information of broadcasting time of the reserved program after reserving to record a program, and the comparing and determining means 23g which compares the specific information of the service additional information of the plural overlapped reserved programs when the memory control means 23h detects overlapping of recording time of plural reserved programs, selects either one of the plural reserved programs on the basis of the result of comparison, of the service additional information of the overlapped plural reserved programs, and determines to record this program. Therefore, if overlapping in recording time of plural reserved programs occurs by change of broadcasting time of the reserved program after reservation of plural programs, the preferred program for the user is automatically recorded.

Incidentally, when plural programs are reserved for recording, change of broadcasting time of one program may cause overlapping of recording time even if there is no overlapping of recording time initially. In such a case, the operation of the change memory means of the information recording apparatus of embodiment 1 is described specifically below.

FIG. 6-a is a diagram of an example of the EPG displayed on the screen, showing the EGP from 20:00 to 23:00 of channels 1, 3 and 5 on Jul. 31, 1996. In FIG. 6-a, shaded cells, that is, "Baseball: ABC vs. XYZ" on channel 1 and "Movie: Jurassic Land" on channel 3 are reserved programs. Herein, the broadcast of "Baseball: ABC vs. XYZ" has started and is being recorded in the second memory means 26, and suppose the broadcasting time of the baseball game is extended by 20 minutes. The service additional information including the change information of the broadcasting time that the broadcasting time of the baseball game is extended by 20 minutes is sent from the transmitting side, and the information receiving apparatus 100 receives the service additional information containing this change information (step 8). This service additional information is decoded in the channel decoder 17, and is put into the input and output information controller 23 through the demultiplexer 18, related information processor 20, and information composite unit 21. The update information entered in the information input and output controller 23 is put into the memory control means 23h. The memory control means 23h receiving the update information confirms that the program indicated in this service additional information is listed in the EPG recorded in the first memory unit 25 (step 9), and the recorded data is updated according to the update data (step 11), and it is judged whether this program overlaps with the recording time of other plural reserved programs (step 12). In this example, it is known that the present program being recorded overlaps with the recording time of the "Movie: Jurassic Land" on channel 3 for 20 minutes from 21:00. At step 9, incidentally, if the program corresponding to the time change is not found in the EPG, the received service additional information is discarded (step 10). Further, if overlapping of recording time is not detected at step 12, the change processing of the broadcasting time is terminated at this point (step 13).

In the memory control means 23h, if it is detected that overlapping of recording time occurs in plural reserved programs, the comparing and determining means 23g reads out the service additional information of "Baseball: ABC vs. XYZ" and "Movie: Jurassic Land" stored in the first memory unit 25, and compares them, and determines which program to record in the overlapped time (step 14). The service additional information may be considered to include, for example, information about data size of program, viewing fee of program or tariff information of the program, information about whether the program distribution time is fixed or not, that is, whether the program is video on-demand or near video on-demand or single distribution only, information whether program is a series piece or a single piece, and many other various information. The comparing and determining means 23g of the information receiving apparatus of embodiment 1 of the invention compared specific information out of the information contained in the service additional information of each program, and determines which program to record, out of plural programs overlapped in the recording time on the basis of a specific criterion. Such specific information may be preset by the user through the external signal input unit 22.

For example, as the information to compare, if the program tariff information is used, the comparing and determining means 23g investigates the tariff information of two programs out of the service additional information, and, if the baseball is higher in tariff than the movie, determines to record the baseball continuous till the end, and start to record the movie when the recording of the baseball is over, whereas the memory control means 23h changes the EPG in the first memory unit 25 and the content of the reserved programs according to the above determination (steps 15 and 16), and records the program into the second memory unit 26 according to the reserved program information after the change.

In the information receiving apparatus of embodiment 1, after reservation of recording of a program by the user, if the broadcasting time of the program is changed and the recording time of plural programs is overlapped, and the comparing and determining means 23g of the input and output information controller 23 automatically determines to record either one of the programs, usually, the user does not know such decision is made. However, in the information receiving apparatus shown in FIG. 1, by installing display means such as LED to display such decision, or communication means for transmitting such decision to mobile communication device held by the user such as cellular phone, the user recognizes that the reserved program is changed. Moreover, in addition to such display of decision, in the information receiving apparatus of embodiment 1, if the program list compiling means 23i compiles the EPG containing this decision, and displays this EPG on the monitor screen according to the request of the user, the user instantly knows what change is made in the reserved programs. FIG. 6-b is a diagram showing an example of EPG containing such change information. As shown in the example in FIG. 6-b, in the EPG containing the decision change information, in spite of the cell of the reserved program, the portion not to be recorded is not shaded, and it is visually and clearly known which time zone of the program is to be actually recorded.

In the explanation of embodiment 1, when the recording time of plural programs is partly overlapped, the both programs are recorded in the non-overlapped portions, and either program is selected and recorded in the overlapped portions, but such selection may be made in the unit of a program. That is, when the comparing and determining means 23g selects a program, it may be determined not to record the non-selected program at all, not only the overlapped portion but also the non-overlapped portion in recording time. By such decision, when the program is charged with a viewing fee, disadvantageous charging of the tariff in spite of only partial recording of the program can be avoided.

In the information receiving apparatus of embodiment 1, when the recording time of plural programs is overlapped due to change of broadcasting time of program after operation for reservation of recording of a program, the comparing and determining means 23g of the input and output information controller 23 is designed to determine to record either program automatically.

Below is explained a first modified example of the information receiving apparatus of embodiment 1.

Figure 4:
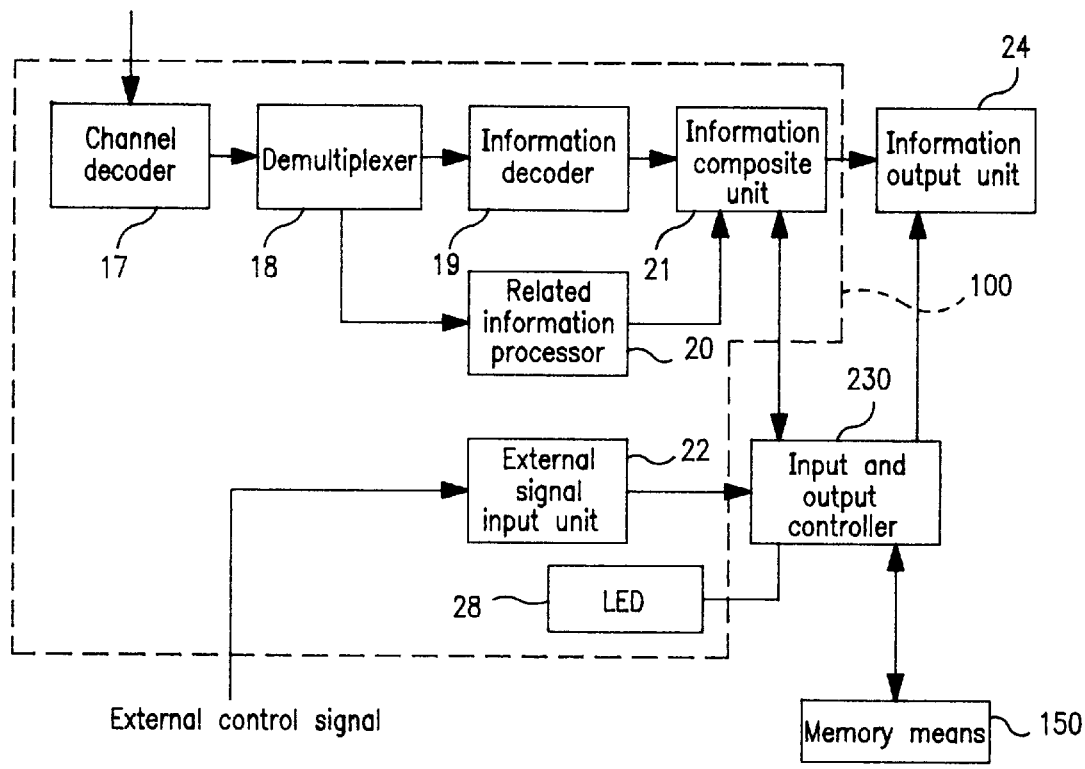
FIG. 4 is a diagram showing a structure of a modified example of the information receiving apparatus of embodiment 1 of the invention.
Figure 12:
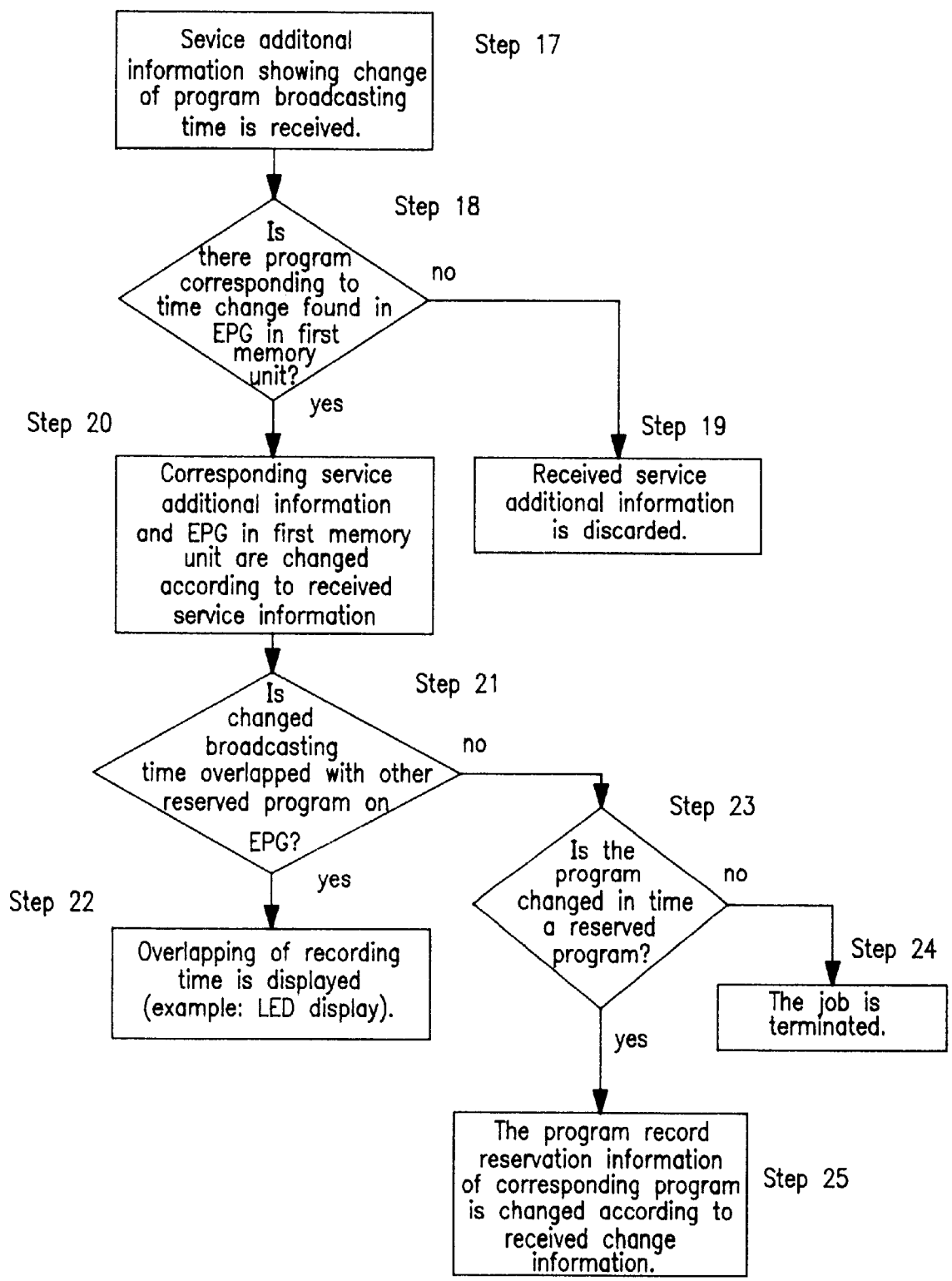
FIG. 12 is a diagram showing the flow of operation due to change in the broadcasting time of a program in the information recording apparatus in embodiments 1 and 5 of the invention.
Figure 13:
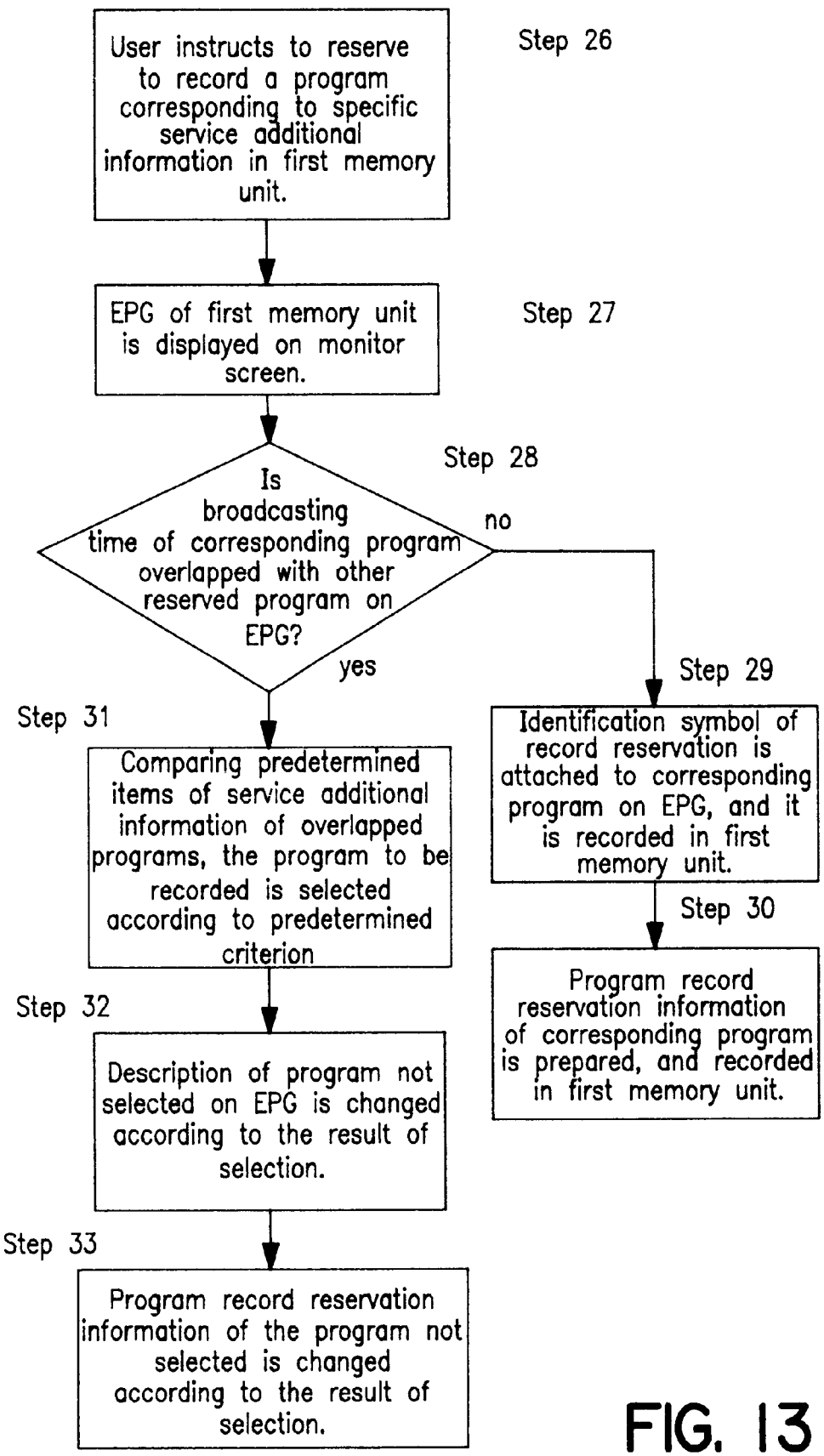
FIG. 13 is a diagram showing the flow of operation relating to reservation for recording in the information receiving apparatus of embodiment 2 of the invention.
Figure 14:
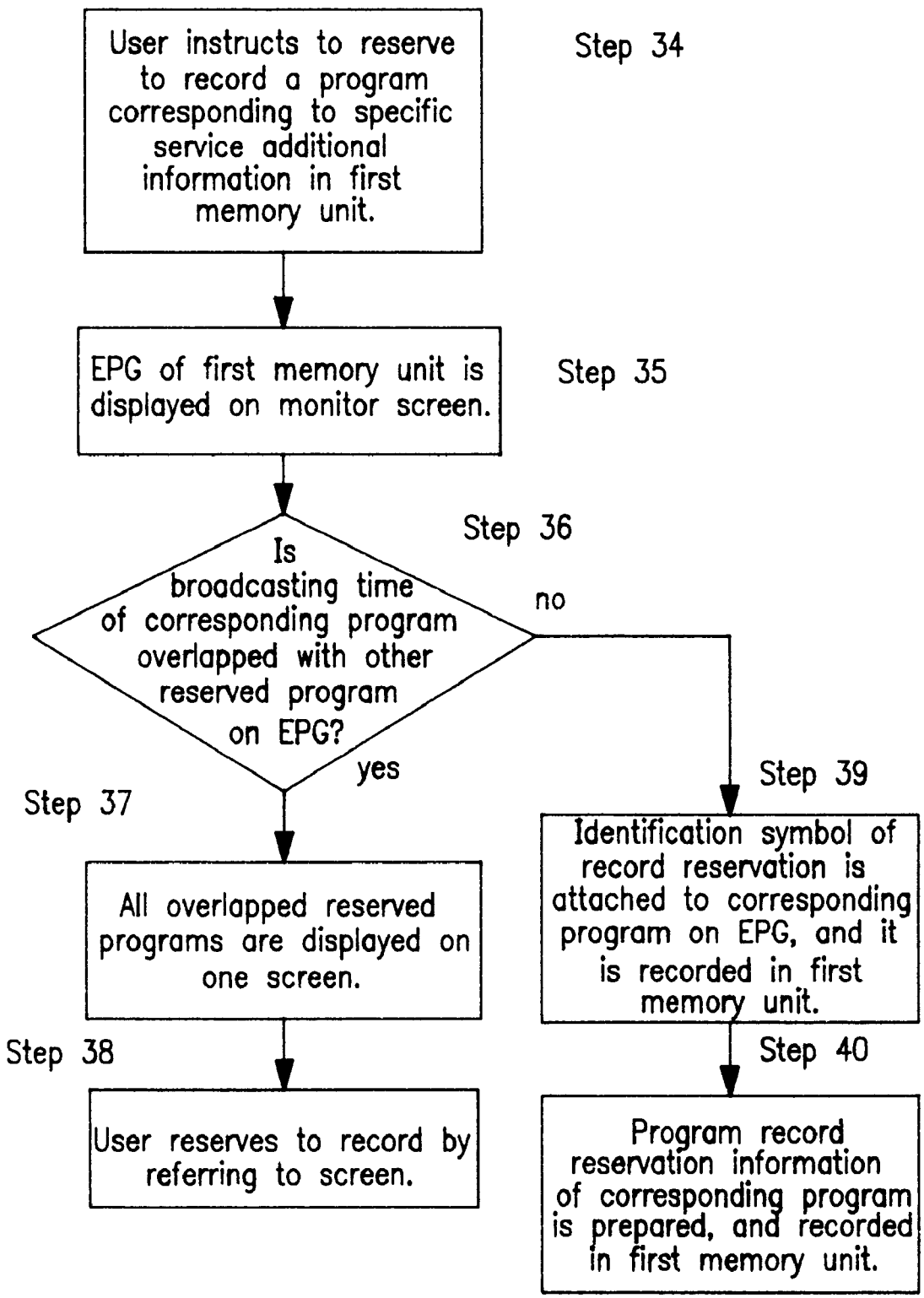
FIG. 14 is a diagram showing the flow of operation for reservation to record a program by the user in the information recording apparatus of embodiments 1 and 2 of the invention.
Figure 15:
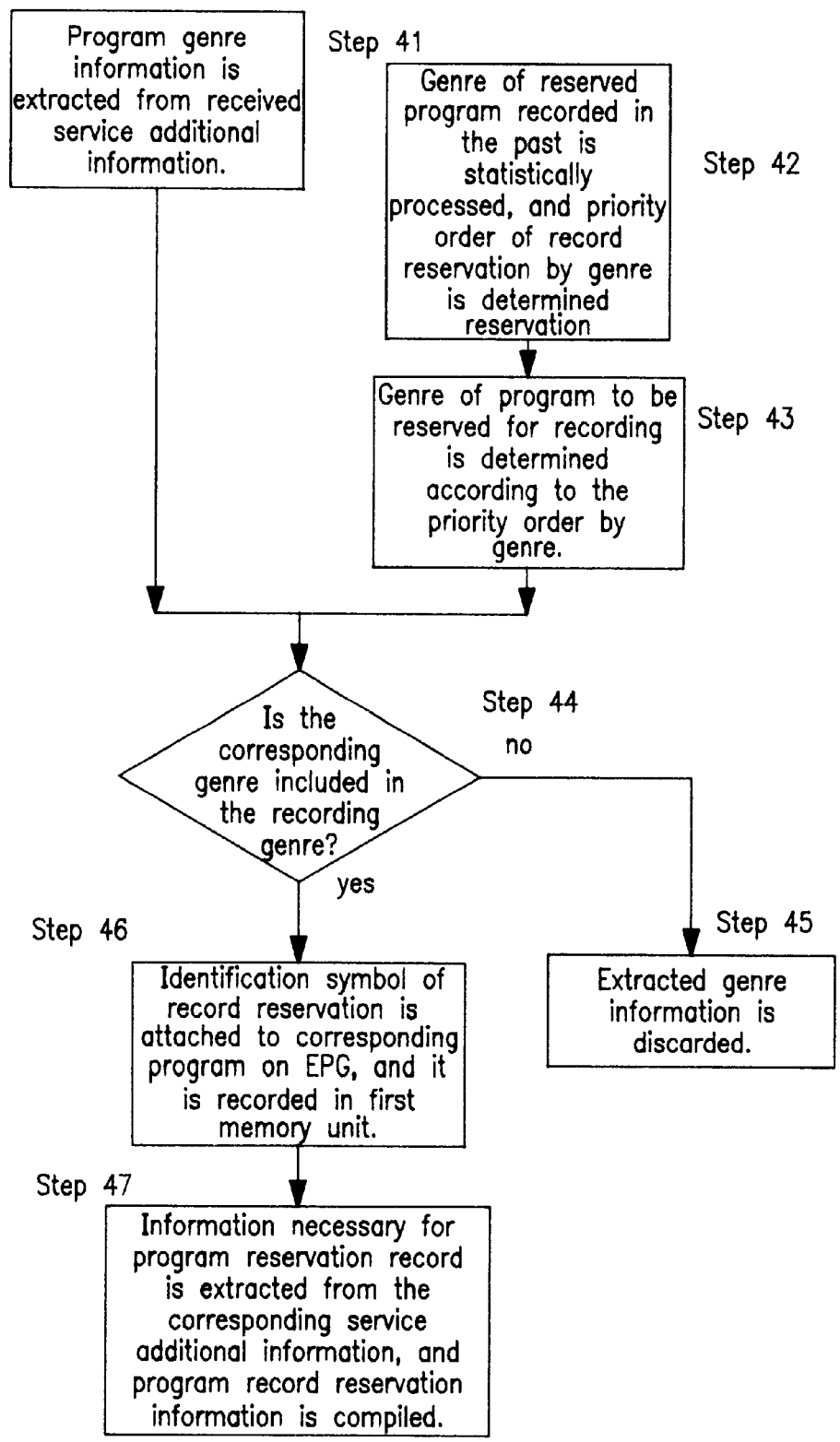
FIG. 15 is a diagram showing the flow of automatic operation for reserving to record in an information receiving apparatus of embodiment 4 of the invention.

The first modified example is structured as shown in FIG. 4, and its operation is as shown in steps 17 to 22 in FIG. 12. In particular, steps 17 to 21 are exactly same as in the foregoing steps 8 to 12, and the explanation is omitted. An input and output information controller 230 of this modified example detects only overlapping of the recording time of plural programs, and does not determine which program is to be recorded (step 21), and tells the occurrence of duplication of recording time to the user by displaying, for example, by lighting up display means such as LED 28 (step 22). In such structure, the user recognizes duplication of recording time of plural programs by the lighting of the LED 28, and can operate again to reserve recording by thinking which one of the duplicated programs in recording time should be recorded. Therefore, the program preferable for the user can be recorded. Although this input and output information controller 230 does not determine whether or not to record the program, when reserving to record a program by using the input and output information controller 23 in FIG. 1, as shown in steps 23 to 25 in FIG. 12, if the program changed in the broadcasting time is the reserved program, the information of the reserved program is changed according to the detail of change, and if it is not a reserved program, this job is terminated (step 24).

If, however, the user is away and not present near the information receiving apparatus when the recording time of plural programs is overlapped, by the display by lighting the LED 28 as mentioned above, the user cannot recognize the overlapping of recording time of the plural programs. As a countermeasure, it may be considered to compose an information receiving apparatus comprising communication means for noticing that the recording time of plural programs is overlapped to a mobile communication device such as a cellular phone carried by the user when the input and output information controller detects overlapping of recording time of plural programs. Thus the user, if away from the information receiving apparatus, can recognize overlapping of recording time of plural programs. Moreover, when the user recognizes overlapping of recording time of reserved program if away from home, it may be designed to make a telephone call to the home of the information receiving apparatus through general telephone, cellular phone, PHS or PDA, or to instruct the information receiving apparatus to record which program, by using the DTMF, voice synthesis or voice recognition. (said PHS is an abridgment of Personal Handyphone System which is one of mobile communicating system in Japan and said PDA is an abridgment of Personal Digital Assistant).

Below is described the information to be compared by a comparing and determining means 23i.

In the information receiving apparatus in embodiment 1, the comparing and determining means 23g of the input and output information controller 23 compares the tariff information contained in the service additional information of each program, and selects the program to be recorded, but it may be also designed to compare the information other than the tariff information contained in the service additional information, and select the program to be recorded.

Moreover, instead of fixing the information to be compared, the user may designate the specific information desired out of the service additional information by giving an instruction to the input and output information controller from external input means, such as remote control device or keyboard, so that the program more preferable for the user may be recorded.

If tariff discount information is included in the service additional information, it may be also designed to record the program credited with the tariff discount information by first priority.

Concerning the information to be compared out of the service additional information, a slightly specific description is given about an example of the information relating whether the program distribution time is fixed or not, that is, whether the program is video on-demand or near video on-demand or a single distribution only. In this case, the comparing and determining means 23g selects to record which one of the plural programs overlapped in recording time, for example, as follows. That is, if detecting one of the overlapped programs is fixed in distribution time, that is, a single distribution alone, and the other is near video on-demand or video on-demand, the program of the fixed distribution time is reserved for recording by priority, and as for the near video on- demand or video-on demand program, it is determined to change the recording time to reserve to record in other non-overlapping time. At this time, even in the case of the program fixed in distribution time, if repeat broadcasting is scheduled in advance and the information of repeat broadcasting such as channel and date of repeat broadcasting is included in the service additional information, such program may be handled same as the near video on-demand or video on-demand program.

When handling the program of fixed distribution time to be broadcast again in this manner, by setting the upper limit value of the recording time change, for example, one month, and if the program is to be repeated in this period, the recording time of this program may be changed to the time of the repeat broadcast, and if the repeat date is over the upper limit, the program may be handled as the program of fixed distribution time.

Incidentally; the program to be recorded may be determined on the basis of the tariff points of charged program included in the service additional information and the program viewable points held at the information receiving apparatus side. The point is the amount of the viewing fee expressed in a point system. An example of operation in this case is described below. For example, if the recording time of program A and program B is overlapped, the comparing and determining means 23g reads out the program tariff points of program A and program B in the service additional information from the first memory means, when the sum of the tariff points of program A and tariff points of program B is larger than the program viewable points, if the tariff points of either program A or B are larger than the program viewable points, it is determined to record the program of which tariff points are within the program viewable points, and not to record the other, if the each tariff points of both program A and B are smaller than the program viewable points, it is determined to record the program having higher tariff points. On the other hand, when the sum of the tariff points of program A and tariff points of program B is within the program viewable points, it may be determined to record both programs in the non-overlapped recording time, and record the program of the higher tariff points in the overlapped recording time.

In the above explanation, instead of recording the program of the higher tariff points, the user may be also allowed to set to select to record the program of lower tariff points.

Further, the program to be recorded may be determined on the basis of the information about the data size or the program contained in the service additional information and the memory capacity of the second memory 26 for storing the contents. An example of operation in this case is described below.

For example, when the recording time of program A and program B is overlapped, the comparing and determining means 23g reads out the information about the data size of the program in the service additional information of programs A and B out of the first memory means 25, and when the balance of subtracting the data size of the overlapped portion of programs A and B from the sum of the data size of program A and data size of program B is larger than the remaining memory capacity of the second memory means 26, on the whole, the priority of the program is lower in the program later in the program ending time, and it may be controlled to record the final portion of the contents as far as the capacity of the memory unit permits. In the overlapped portion of the recording time, it is determined to record the earlier program, so that at least one program may be recorded completely.

On the other hand, when the balance of subtracting the data size of the overlapped portion of programs A and B from the sum of the data size of program A and data size of program B is smaller than the remaining capacity of the memory unit, it is determined to record each program in the non-overlapped recording time, and record the program of the smaller data size in the overlapped recording time. This is because the program of larger data size is smaller in the ratio of the data size in the overlapped portion in the entire program, so that the effect of non-recording on the appreciation of the program may be considered small.

Of course, instead of recording the program of smaller data size in the overlapped recording time as mentioned above, the user may be also allowed to set to determine to record the program of larger data size.

Figure 5:
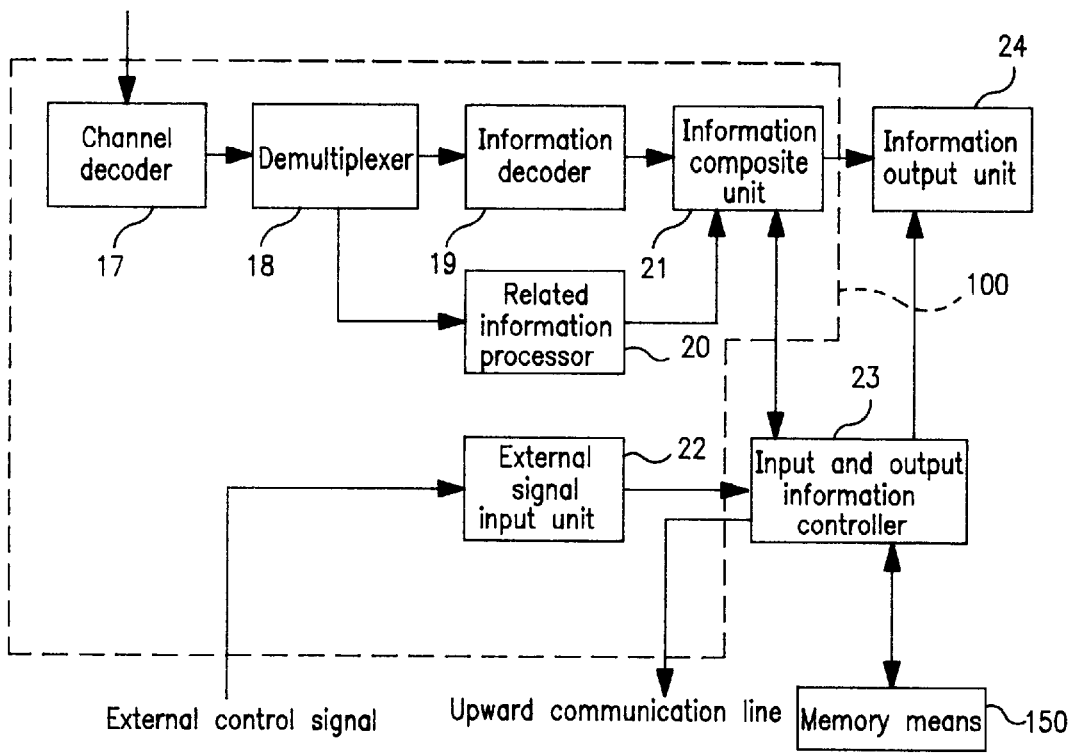
FIG. 5 is a diagram showing a structure of other modified example of the information receiving apparatus of embodiment 1 of the invention.

In the information receiving apparatus of embodiment 1, meanwhile, the comparing and determining means 23g of the input and output information controller 23 determines the program to be recorded by comparing only the information included in the service additional information of each program, but it may be also constituted to determine the program to be recorded in consideration of other information than the information included in the service additional information of the programs by the comparing and determining means. For example, as shown in a modified example in FIG. 5, it is possible to check the user's account balance through an upward communication line, compare the balance with the tariff of the programs, and select a payable program considering from the balance.

A second modified example of the information receiving apparatus of embodiment 1 is described below.

Figure 8:
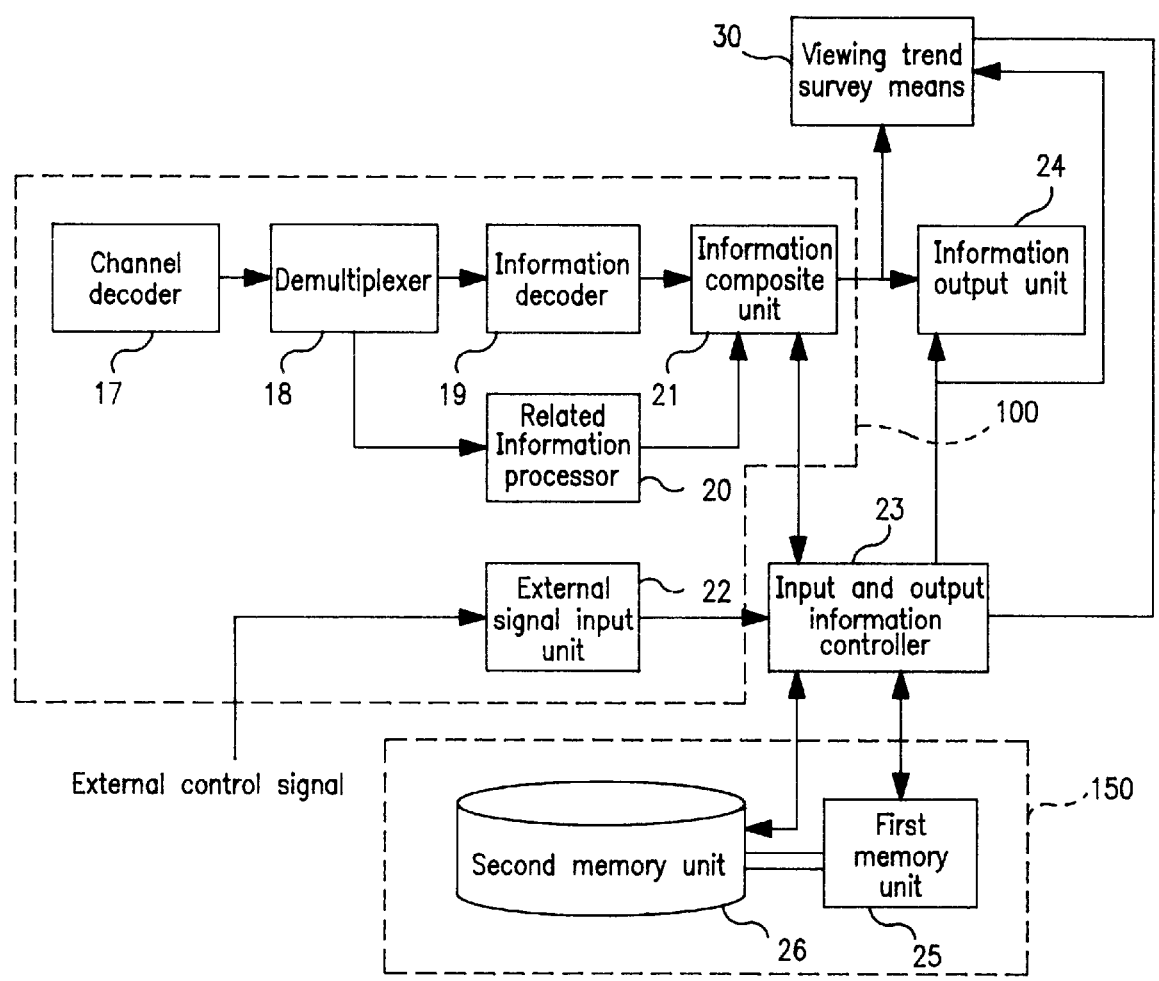
FIG. 8 is a diagram showing a structure of a modified example of the information receiving apparatus of embodiment 1 of the invention.

FIG. 8 shows a structure of the second modified example of the information receiving apparatus. Herein, viewing trend survey means 30 for investigating the viewing trend of the user is provided in the information receiving apparatus of embodiment 1. The viewing trend survey means 30 records the information about the genre of the programs viewed by the user in the past, and processes statistically, and investigates the viewing trend of the user. To understand the viewing trend accurately, the program genre is coded at the information provider side and added to the service additional information.

Thus, using the viewing trend survey means 30, when the recording time of plural programs is overlapped, the comparing and determining means 23g compares the genre information in the service additional information of each program with the viewer's viewing trend information recorded in the viewing trend survey means 30, and determines the program same as or similar to the viewing trend of the user as the program to be recorded.

Embodiment 2

In the information receiving apparatus in embodiment 1, when the recording time of plural programs is overlapped due to change of broadcasting time after reservation of recording of a program, the comparing and determining means 23g of the input and output information controller 23 determines automatically the program to be recorded, whereas in the case of the information recording apparatus of embodiment 2, when a program desired to be reserved for recording overlaps with the recording time of other program already reserved for recording at the time to set the program reserved for recording, the input and output information controller automatically determines to record either program.

The structure and operation of the information receiving apparatus in embodiment 2 are described below.

The entire structure of the information receiving apparatus of embodiment 2 is exactly same as the information receiving apparatus in embodiment 1. The structure of its input and output information controller 23 is also same as shown in FIG. 2. The operation of the memory controller 23h is same as that in the information receiving apparatus in embodiment 1, but the timing of operation is different. That is, in the information receiving apparatus in embodiment 1, it is designed to operate when detecting change in broadcasting time of one reserved program, whereas in the information receiving apparatus in embodiment 2, every time a program is reserved for recording, the memory controller 23h detects for overlapping of recording time. This operation includes a case of user's operation for record reservation and a case of automatic operation by the information receiving apparatus. The case of user's operation for record reservation is described below. The user displays the EPG on the monitor screen (step 27), and reserves to record a program, but when there are too many channels being broadcast, related programs of all channels cannot be displayed in one screen of the EPG, and the user must change over the screen of the EPG and searches a program to be reserved for recording. In this case, when selecting plural programs on different screens of the EPG, the recording time may be overlapped by mistake. In such a case, the memory controller 23h in FIG. 2 compares the time information of the service additional information of plural programs reserved for recording, and judges if the recording time is overlapped or not (step 28). When the memory controller 23h detects overlapping of recording time of plural programs reserved for recording, the comparing and determining means 23g reads out the service additional information of the plural programs overlapped in the recording time recorded in the first memory unit 25, compares the specific information in the service additional information of the plural programs on the basis of the specified criterion, and determines which program to be recorded (step 31). The EPG and the program record reservation of the program not selected as a result of determination are corrected according to the result of determination (steps 32 and 33). At step 28, if there is no overlapping of recording time, the program on the EPG is added to an identification symbol of record reservation (step 29), and the program record reservation information is prepared (step 30).

Said specific information may be preliminarily designated by the user.

A practical example of the above operation is given below. For instance, the user reserves to record "Movie: Jurassic Land" of channel 3 on the EPG screen as shown in FIG. 7-*a*.

As shown in the screen in FIG. 7-*b* which is not displayed on the present monitor screen, suppose "Move: Here Lie the Trees Now" of channel 51 is reserved for recording. These two programs are overlapped in recording time, and the memory controller 23h detects this overlapping. The comparing and determining means 23g reads out the service additional information of the two programs overlapped in recording time being recorded in the first memory unit 25, and compares, according to the specific criterion, for example, the program tariff information as mentioned in the explanation of embodiment 1, compares the data size information of the programs and memory remaining capacity, or compares the viewing trend and program genre, and determines the program to be recorded on the basis of the result. The memory controller 23h changes the EPG and program record reservation information according to the result of determination by the comparing and determining means 23g, records in the first memory means 25, and records the program in the second memory unit 26 on the basis of the program record reservation information.

In such information receiving apparatus of embodiment 2, when the user is setting a program to be reserved for recording, if the recording time of the setting program is overlapped with the recording time of other program already reserved for recording, the input and output information controller 23 determines the program to be recorded automatically according to a specific criterion, and reserves to record. Therefore, not having to set to reserve for recording again, the program preferred to the user is recorded automatically, and the convenience of operation of record reservation can be enhanced. Instead of the user's record reservation, the same operation is possible also in the case of automatic operation by the information receiving apparatus.

In the information receiving apparatus of embodiment 2, since the user sets reservation for recording on the screen shown in FIG. 7-*a*, if overlapping of recording time of programs occurs, the user may not recognize that the program selection has been determined. In the information receiving apparatus as shown in FIG. 1, when display means such as LED for showing such program selection is provided, the user can recognize that the content of the program record reservation has been changed.

Also in the information receiving apparatus as shown in FIG. 1, when communication means to transmitting to a mobile communication device such as cellular phone carried by the user to tell the determination is provided, the user knows, if away from home and not present by the information recording apparatus side, that the content of the program record reservation has been changed by, for example, the operation of program record reservation by other family member of the user's home.

In addition to such display of determination, in the information receiving apparatus in embodiment 2, program list compiling means 23i compiles a program list including this determination content, that is, the EPG, and displays this EPG on the monitor screen according to the user's request, so that the user recognizes the content of the program record reservation at a glance. FIG. 7-c is a diagram showing an example of EPG including the content of determination. That is, the program list compiling means 23i shuffles the channel sequence to show the overlapped channels side by side on the same screen, and displays the result of determination on both programs on the same screen. In the example shown in FIG. 7-c, the cell of the determined and selected program "Movie: Jurassic Land" is shaded, and the cell of the not selected program "Movie: Here Lie the Trees Now" is indicated by ** mark. Herein, FIG. 7-c displays that the not selected "Movie: Here Lie the Trees Now" is determined not to be recorded at all.

Thus, the user easily knows the overlapped program names and overlapped time, and recognizes at a glance which reserved program is to be recorded. Incidentally, instead of displaying the EPG including the content of determination according to the user's request, it may be always and automatically displayed on the monitor screen when the input and output information controller 23 determines the program selection.

The information receiving apparatus of embodiment 2 is designed to determine the program to be recorded automatically by the comparing and determining means 23g of the input and output information controller 23 when overlapping in recording time of programs occurs.

Herein, in a certain case, it may be considered that the input and output information controller 23 only detects overlapping of recording time of plural programs, but does not determine which program to be recorded. In such a case, when the user reserves to record a specific program in the EPG (step 34), first the EPG is read out from the first memory unit 25 (step 35), and it is detected whether the broadcasting time of the program overlaps with the recording time of other already reserved program or not (step 36). If overlapping is detected, the program list compiling means 23i of the input and output information controller 23 changes the sequence of displayed channels so that the overlapped programs may be shown on a same screen, and prepares the shuffled EPG so that the overlapped channels are shown side by side, and this overlapped content may be displayed on the monitor screen (step 37). In such onstitution, the user reviews the displayed EPG and recognizes that the recording time of plural programs is overlapped, then decides which one of the plural programs overlapped in recording time is to be recorded, and manipulates again to reserve to record, so that the program desired for the user can be recorded (step 38). Incidentally, if overlapping is not detected at step 36, an identification symbol of record reservation is added to the program on the EPG (step 39), and the program record reservation information of the program is prepared, and is recorded in the first memory unit 25 (step 40).

Embodiment 3

The information receiving apparatus according to embodiments 1 and 2 are intended to select to record which one of the programs automatically by the comparing and determining means 23g of the input and output information controller 23 in case the recording time of plural programs is overlapped. The information receiving apparatus in embodiment 3 is designed to record, when the recording time of plural programs is overlapped, both programs alternately by dividing in each specific time unit for the overlapped portion of recording time.

The structure and operation of the information receiving apparatus in embodiment 3 are described below. The entire structure of the information receiving apparatus in embodiment 3 is exactly same as that of the information receiving apparatus in embodiment 1 or 2 shown in FIG. 1. The structure of its input and output information controller 23 is also same as shown in FIG. 2, except that, when the memory control means 23h detects overlapping of recording time of programs, the comparing and determining means 23g determines to record both programs alternately by dividing in each specific time unit, instead of determining either program to be recorded.

That is, in the information receiving apparatus in embodinment 3, in the case that an overlapping of recording time of plural reserved programs occurs when or after reserving to record, the memory control means 23h in FIG. 2 detects this overlapping of recording time, and the comparing and determining means 23g reads out the service additional information of the plural programs overlapped in recording time being recorded in the first memory unit 25, compares the service additional information of the plural programs according to a specific criterion, and record the both programs alternately at a specific time rate in the overlapped portion of recording time.

Figure 9:
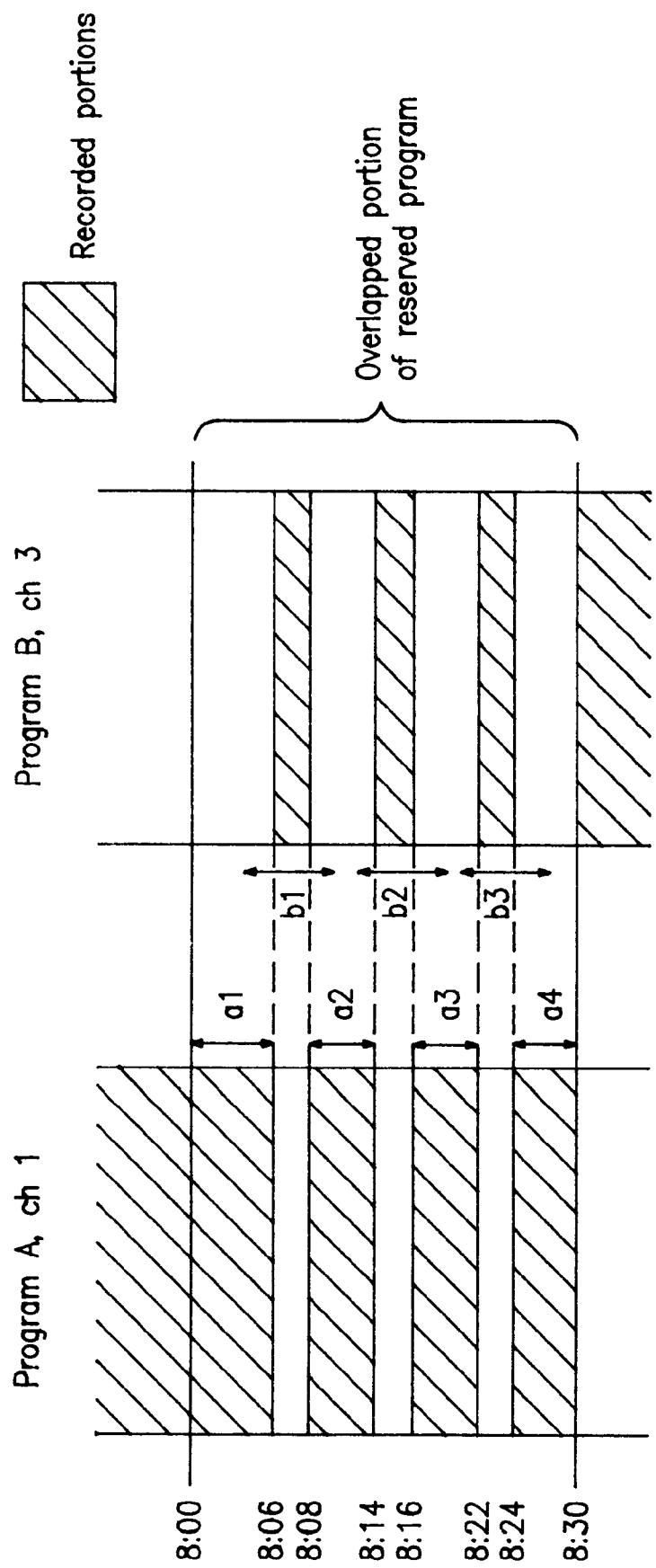
FIG. 9 is a diagram for explaining the recording operation of an information receiving apparatus according to embodiment 3 of the invention.

This is specifically described below by referring to FIG. 9. For example, program A of channel 1 and program B of channel 3 are reserved for recording, and their recording time is overlapped for a period of 8:00 to 8:30. The comparing and determining means 23g reads out the service additional information of both programs overlapped in recording time being recorded in the first memory unit, compares the service additional information of the plural programs on the basis of a specific criterion, and determines the recording format of the programs in this period of 8:00 to 8:30. FIG. 9 is a diagram showing an example of recording format in the overlapped time, and in this example, for 6 minutes from 8:00 to 8:06, (a1) of program A is recorded, for 2 minutes from 8:06 to 8:08, (b1) of program B is recorded, for 6 minutes from 8:08 to 8:14, (a2) of program A is recorded, for 2 minutes from 8:14 to 8:16, (b2) of program B is recorded, for 6 minutes from 8:16 to 8:22, (a3) of program A is recorded, for 2 minutes from 8:22 to 8:24, (b3) of program B is recorded, and for 6 minutes from 8:24 to 8:30, (a4) of program A is recorded. In this way, after recording program A for a specific time, 6 minutes in this case, program B is recorded for a specific time, 2 minutes in this case, and thereafter this operation is repeated and both programs are recorded alternately in the overlapped time. Herein, the unit time for recording each program can be set at a specific time rate depending on the priority of the two programs. The priority may be judged, same as in embodiment 1 or 2, by comparing the service additional information of both programs, or by comparing the service additional information with other information. When recording the contents of each program thus divided into the second memory unit 26, the service additional information relating to the recording format of the contents of each divided program is prepared, and this service additional information is recorded together with the program contents.

This service additional information includes "presence of other related contents," "reproducing sequence of individual contents," and other information so as to be capable of reproducing the contents of each divided program continuously in each program after recording.

That is, in (a1) which is a part of the contents of program A, the service additional information includes the data name of this portion as (a1), presence of other related contents with data names of (a2) to (a4), and the continuous reproduction in the sequence of (a1), (a2), (a3), and (a4).

Thus, by recording the service additional information together with the divided contents, when the user reproduces the recorded program, as shown in FIG. 10-a and FIG. 10-b, the recording time is not overlapped, and the normally recorded portion is directly reproduced, and the alternately recorded portion in the overlapped recording time is spliced according to the service additional information recorded together and is reproduced continuously.

In the information receiving apparatus of embodiment 3, when the recording time of the reserved programs is overlapped, the input and output information controller 23 determines to record both programs alternately according to a specific time rate in the overlapped recording portion, so that a preferable program recording may be done automatically.

Embodiment 4

The information receiving apparatus of the foregoing embodiments 1, 2 and 3 relates to solving of problems relating to overlap of recording time of reserved programs due to change in broadcasting time of programs. In the information recording apparatus in embodiment 4, whether or not to reserve to record a program newly introduced in service additional information is judged automatically by the information receiving apparatus, and its result is executed.

In this information receiving apparatus, to the information receiving apparatus as set forth in claim 4, viewing trend survey means 30 for recording the information about the genre of programs reserved for recording in the past, and analyzing the information and investigating the viewing trend of the user is added, and also a function of comparing the information about the genre of the program added to the service additional information with the viewing trend by the viewing trend survey means 30, and judging whether or not to reserve to record the program on the basis of the result is added to the comparing and determining means 23g.

Concerning the operation of this information receiving apparatus, only the feature points are described below.

The service additional information describing the information about the genre of the program by the sender of the service additional information is received, and the genre information of the program is extracted (step 41).

The viewing trend survey means 30 analyzes the genre of the programs reserved for recording in the past, and adds the recording priority to the genre of the high frequency of record reservation (step 42), and determines the genre to reserve for recording by using the record reservation priority by genre (step 43). When the information receiving apparatus receives new service additional information, the comparing and determining means 23g judges if the genre of the service additional information is contained in the genre of record reservation or not (step 44), and judges whether or not to reserve to record on the basis of the judging result, adds the symbol of record reservation to the cell of the program in the EPG when reserving to record (step 46), and creates the program record reservation information describing the content of the reserved program (step 47). Therefore, if the user does not judge to reserve to record or manipulate to set the reservation, the program suited to the preference of the user is reserved and recorded. If determined not to reserve to record at step 44, the extracted genre information is discarded (step 45).

Moreover the genre of the program to be recorded may be directly entered by the user.

The effects of the invention are described below.

First, according to the information receiving apparatus of the first exemplary embodiment of the invention, when receiving the service additional information including the information of change of broadcasting time of a reserved program already reserved to be recorded, the memory control means comprises display means for displaying overlapping of recording time of plural reserved programs due to change in broadcasting time of the reserved program. Therefore, after reservation for recording of plural programs by the user, if overlapping of recording time of plural reserved programs should occur due to change in broadcasting time of the reserved program, the user easily recognizes this, so that counteraction to the duplicate reservations can be possible.

Also, according to the information receiving apparatus of a further exemplary embodiment of the invention, when receiving the service additional information including the information of change of broadcasting time of a reserved program already reserved to be recorded, the memory control means comprises communication means for transmitting overlapping of recording time of plural reserved programs due to change in broadcasting time of the reserved program to the mobile communication device carried by the user. Therefore, after reservation for recording of plural programs by the user, if overlapping of recording time of plural reserved programs should occur due to change in broadcasting time of the reserved program, the user easily recognizes this if away from home, so that counteraction to the duplicate reservations can be possible.

Also, according to the information receiving apparatus of a further exemplary embodiment of the invention, when receiving the service additional information including the information of change of broadcasting time of a reserved program already reserved to be recorded, and the memory control means detects overlapping of recording time of plural reserved programs due to change in broadcasting time of the reserved program, it comprises comparing and determining means for comparing the specific information in the service additional information of the plural reserved programs overlapped in recording time, and determining either one program out put the plural overlapped reserved programs for the overlapped recording time on the basis of the result of comparison. Therefore, after reservation for recording of plural programs by the user, if overlapping of recording time of plural reserved programs should occur due to change in broadcasting time of the reserved program, the program recording preferable for the user is performed automatically.

Also, according to the information receiving apparatus of a further exemplary embodiment of the invention, at the time of reservation for recording a program, when the memory control means detects overlapping of the recording time of the program to be reserved for recording with the recording time of other program already reserved for recording, the comparing and determining means compares the specific information in the service additional information of the plural reserved programs overlapped in recording time, and selects a program to be recorded out of the plural reserved programs in the overlapped portion of the recording time on the basis of the result of comparison. Therefore, the user does not have to set again to reserve for recording, and the program recording preferable for the user is performed automatically, so that the convenience of operation may be enhanced.

Also, according to the information receiving apparatus of a further exemplary embodiment of the invention, the viewing trend survey means for investigating the user's viewing trend by recording the viewing history of programs by the user is provided, and the comparing and determining means selects the program to be recorded from the plural reserved programs overlapped in the recording time in consideration of the user's viewing trend investigated by the viewing trend survey means. Therefore, if overlapping of recording time occurs in plural reserved programs, the preferred program on the basis of the user's viewing trend is recorded automatically.

Also, according to the information receiving apparatus of a further exemplary embodiment of the invention, display means is provided for displaying that the comparing and determining means has selected a program to be recorded out of plural reserved programs overlapped in recording time. Therefore the user easily recognizes that overlapping in recording time occurs in plural reserved programs and that a program to be recorded has been selected out of the overlapped plural reserved programs.

Also, according to the information receiving apparatus of a further exemplary embodiment of the invention, there is communication means for transmitting that the comparing and determining means has selected a program to be recorded out of plural reserved programs overlapped in recording time, to a mobile communication device. Therefore the user easily recognizes, if away from home, that overlapping in recording time occurs in plural reserved programs and that a program to be recorded is selected out of the overlapped plural reserved programs.

Also, according to the information receiving apparatus of a further exemplary embodiment of the invention, program list compiling means is provided for compiling an EPG displaying the result of determination by the comparing and determining means and displaying the compiled EPG on a monitor screen. Therefore, if overlapping in recording time occurs in plural reserved programs, the user confirms at a glance the program to be recorded out of the plural overlapped reserved programs.

The information receiving apparatus of a further exemplary embodiment of the invention comprises the program list compiling means for compiling an EPG newly displaying plural reserved programs overlapped in recording time on a same screen, and displaying the compiled EPG on a monitor screen, at the time of reserving by the user reserving to record a program by using a specific screen of the EPG, when the memory control means detects overlapping of the recording time of a program to be reserved for recording with the recording time of a program already reserved for recording. Therefore, if overlapping of recording time of plural reserved programs occurs on different screens of the EPG, the user can check at a glance, and can reserve to record easily and correctly.

The information receiving apparatus of a further exemplary embodiment of the invention comprises the comparing and determining means for determining to record both of plural reserved programs overlapped in recording time alternately by dividing in each specific time when the memory control means investigates for overlapping of recording time in plural reserved programs and detects overlapping. Therefore, if overlapping in recording time occurs in plural reserved programs, both overlapped programs can be recorded, and both contents can be recorded if not completely.

In the information receiving apparatus of a further exemplary embodiment of the invention, the comparing and determining means compares the specific information in the service additional information of the program of the plural reserved programs overlapped in recording time, and determines the rate of specific time for recording the plural reserved programs alternately on the basis of the result of comparison. Therefore, both overlapped programs can be recorded automatically, if not completely, at a more preferred rate for the user.

In the information receiving apparatus of a further exemplary embodiment of the invention, reproducing means is provided for reproducing only specific portions of the program continuously, when reproducing the alternately recorded portions of the both reserved programs by dividing by each specific time. Therefore, in the alternately recorded portions by dividing the two overlapped reserved programs in each specific time, only the recorded portions relating to one program can be viewed continuously.

The information receiving apparatus of a further exemplary embodiment of the invention judges if the program indicated by the service additional information satisfies the user's viewing trend or not, by using the user's viewing trend by the viewing trend survey means and the information about the genre of program in the service additional information, and reserves to record the program automatically if satisfactory, and therefore the user does not have to check and judge the service additional information newly introducing programs, and the program suited to the preference of the user can be reserved and recorded.

According to the information receiving method of a further exemplary embodiment of the invention, when the change in the broadcast time of the program reserved for recording is noticed, or when the user newly sets to reserve for recording, it is automatically investigated whether overlapping broadcasting time of program being reserved with broadcasting time of the already reserved program occurs or not, and if overlapping occurs, it is noticed to the user, so that the user can easily react to overlapping without having to pay attention all the time.

According to the information receiving method of a further exemplary embodiment of the invention, when the change in the broadcast time of the program reserved for recording is noticed through service additional information, or when the user newly sets to reserve for recording, it is automatically investigated whether overlapping broadcasting time of program being reserved with the recording time of the already reserved program occurs or not, and if overlapping is detected, for recording of the overlapped portion, the program preferable for the user is selected automatically, and the record reservation of the selected program can be changed automatically. Therefore, while the user does not have to pay special attention, if the broadcasting time is changed, the preferable program for the user can be recorded.

According to the information receiving method of a further exemplary embodiment of the invention, when receiving new service additional information introducing programs, if a program suited to the preference of the user is found, it is automatically reserved for recording.

Therefore, while the user does not have to pay special attention, the preferable program for the user can be recorded.

What is claimed is:

1. An information receiving apparatus for receiving a program including picture, sound and/or data, and information about the program or service additional information, comprising:

information receiving means for receiving the program and service additional information, memory means for recording the program and service additional information received by the information receiving means, reservation input means for reserving to record the program indicated by the service additional information received by the information receiving means, memory control means for detecting overlap of the program and a further program responsive to the service additional information providing an indication which corresponds to a change of time of one of the program and the further program to cause said program and said further program to overlap, display means for displaying detection of overlapping of recording time of the plurality of reserved programs by the memory control means, receiving means for receiving from a user one of a plurality of criteria upon which a beginning of one of said plurality of reserved programs is to be recording, and selecting means for selecting the beginning of one of said programs for recording based on a) said service additional information and b) said one of said criteria received from said user.

2. An information receiving apparatus for receiving a program including picture, sound and/or data, and information about the program or service additional information, comprising:

in formation receiving means for receiving the program and service additional information, memory means for recording the program and service additional information received by the information receiving means, reservation input means for reserving to record the program indicated by the service additional information received by the information receiving means, memory control means for detecting overlap of the program and a further program responsive to the service additional information providing an indication which corresponds to a change of one time of the program and and the further program to cause said program and said further program to overlap, communication means for transmitting detection of overlapping of recording time of the plurality of reserved programs by the memory control means to a mobile communication device, receiving means for receiving from a user one of a plurality of criteria upon which a beginning of one of said plurality of reserved programs is to be recording, and selecting means for selecting the beginning of one of said programs for recording based on a) said service additional information and b) said one of said criteria received from said user.

3. An information receiving apparatus for receiving a program including picture, sound and/or data, and information about the program or service additional information, comprising:

information receiving means for receiving the program and service additional information, memory means for recording the program and service additional information received by the information receiving means, reservation input means for reserving to record the program indicated by the service additional information received by the information receiving means, memory control means for detecting overlap of the program and a further program responsive to the service additional information providing an indication which corresponds to a change of time of one of the program and the further program to cause said program and said further program to overlap, receiving means for receiving from a user one of a plurality of criteria upon which a beginning of one of a plurality of reserved programs is to be recording, selecting means for selecting the beginning of one of said programs for recording based on a) said service additional information and b) said one of said criteria received from said user, and change memory means for changing and storing the record reservation by the reservation input means on the basis of the result of the selecting means.

4. An information receiving apparatus of claim 3, further comprising viewing trend survey means for investigating the viewing trend of the user by statistically processing the viewing history of the past programs of the user, wherein the selecting means determines the program to be recorded out of plural reserved programs overlapped in recording time in consideration of the viewing trend of the user investigated by the viewing trend survey means.

5. An information receiving apparatus of claim 3, further comprising display means for displaying to have selected one program out of the plural reserved programs overlapped in recording time by the selecting means.

6. An information receiving apparatus of claim 3, further comprising communication means for transmitting to have selected one program out of the plural reserved programs overlapped in recording time by the selecting means to a mobile communication device.

7. An information receiving apparatus of claim 3, further comprising program list compiling means for compiling a program list displaying the result of determination by the selecting means.

8. An information receiving apparatus for receiving a program including picture, sound and/or data, and information about the program or service additional information, comprising:

information receiving means for receiving the program and service additional information, memory means for recording the program and service additional information received by the information receiving means, reservation input means for reserving to record the program indicated by the service additional information received by the information receiving means or indicated by a user, memory control means for detecting overlapping of recording time of program being reserved with the recording time of a reserved program already reserved by the reservation input means when the information receiving means receives the service information telling of a change of broadcasting time of programs and when the user reserves to record a program, comparing and determining means for comparing each program overlapped in recording time according to a) the service additional information of at least one of a plurality of reserved programs overlapped in recording time, and b) previous history of viewing said reserved programs and determining to record the overlapped portions alternately for respective amounts of time which are determined on the basis of the comparison, memory change means for changing and storing the record reservation by the reservation input means on the basis of the result of determination of the comparing and determining means, receiving means for receiving from a user one of a plurality of criteria upon which a beginning of one of the plurality of reserved programs is to be recording, selecting means for selecting the beginning of one of said programs for recording based on a) said service additional information and b) said one of said criteria received from said user.

9. An information receiving apparatus of claim 8, further comprising reproducing means for reproducing only specified program portions continuously when reproducing the alternately recorded portions by dividing in specific time in the overlapped portions of the overlapped reserved programs, so that only the specified program can be reproduced continuously if not completely.

10. An information receiving method for receiving a program including picture, sound and/or data, and information about the program or service additional information, said method comprising the steps of:

receiving the program and service additional information, recording the received program and service additional information, reserving a reservation to record the received program, detecting overlap of the program and a further program responsive to the service additional information providing an indication which corresponds to a change of time of one of the program and the further program to cause said program and said further program to overlap, receiving from a user one of a plurality of criteria upon which a beginning of one of a plurality of reserved programs is to be recorded, and selecting the beginning of one of said programs for recording based on a) said service additional information and b) said one of said criteria received from said user, changing and storing the reservation to record on the basis of the result of selection.

* * * * *